Figure 1:
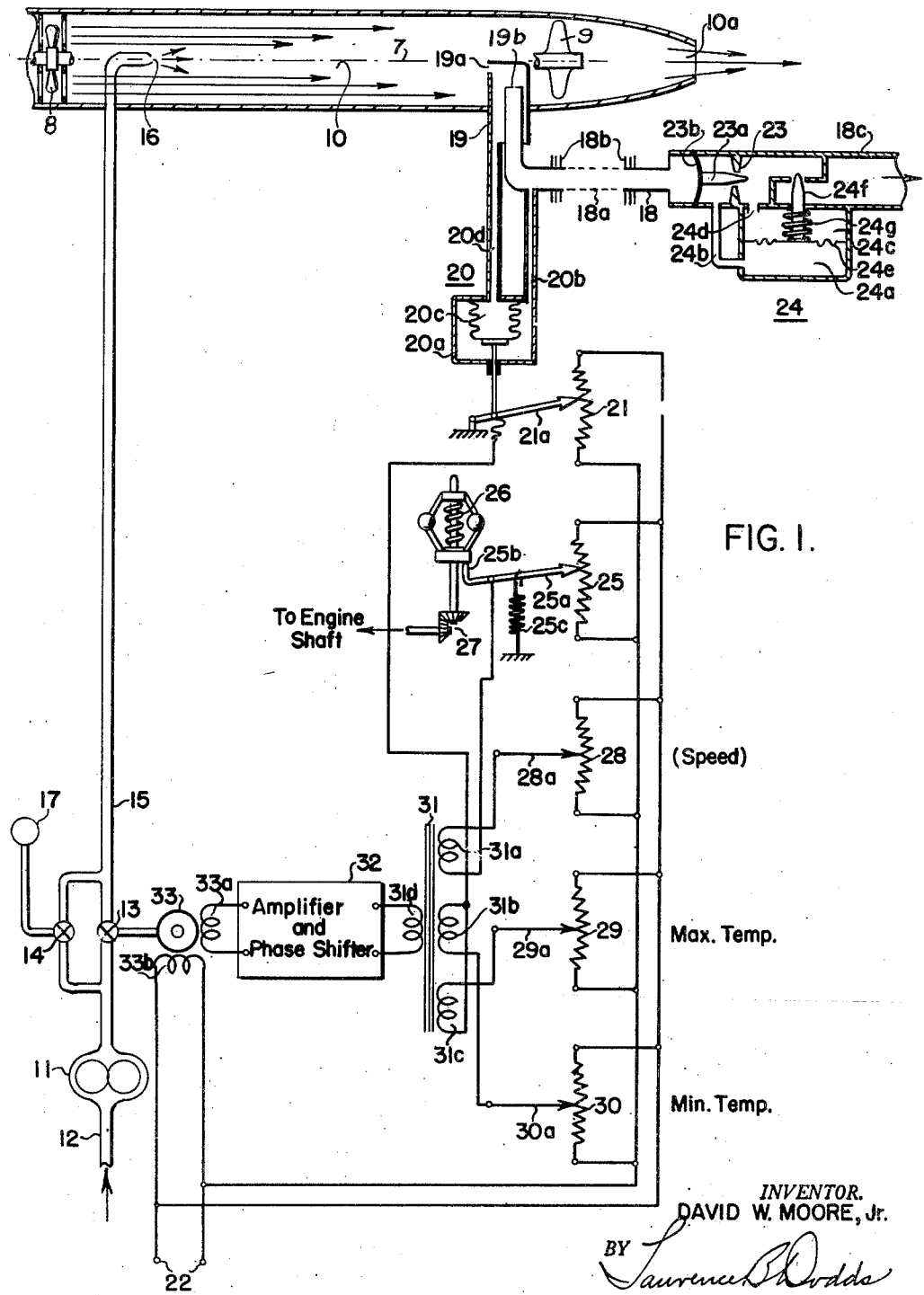

Aug. 12, 1952  D. W. MOORE, JR  2,606,420
ELASTIC FLUID ENGINE CONTROL SYSTEM RESPONSIVE TO
A TEMPERATURE FACTOR OF THE MOTIVE FLUID
Filed March 12, 1947  2 SHEETS—SHEET 2

INVENTOR.
DAVID W. MOORE, Jr.
BY Laurence B. Dodds
ATTORNEY

Patented Aug. 12, 1952

2,606,420

UNITED STATES PATENT OFFICE 2,606,420

ELASTIC FLUID ENGINE CONTROL SYSTEM RESPONSIVE TO A TEMPERATURE FACTOR OF THE MOTIVE FLUID

David W. Moore, Jr., New York, N. Y., assignor to Fairchild Camera and Instrument Corporation, a corporation of Delaware Application March 12, 1947, Serial No. 734,285

30 Claims. (Cl. 60—39.28)

This invention relates to temperature-responsive elastic-fluid control systems and, while it is of general application, is particularly adapted to the control of the combustion temperature or speed, or both, of an elastic-fluid heat-power engine, such as an internal combustion gas turbine, and it will be specifically described in such an application.

In applicant's copending application, Serial No. 604,867, filed July 13, 1945, entitled "Elastic-Fluid Temperature-Responsive System," now Patent 2,549,621, assigned to the same assignee as the present application, there is described and claimed a pneumatic temperature-responsive apparatus utilizing the basic principles of Boyle's law in combination with Gay-Lussac's law or Charles' law, namely, that for any given mass of perfect gas the following equation is satisfied under all conditions of temperature and pressure:

$$PV = RT \qquad (1)$$

where:
- $P$ = absolute pressure of the gas
- $V$ = volume of the gas
- $T$ = temperature of the gas
- $R$ = the gas constant In the system of that application, if a quantity of high-temperature elastic fluid is extracted from its container, cooled, and its mass flow meassured, regulated, or otherwise determined, it is shown that the volumetric flow of the hot gas through a metering orifice, as determined by the differential pressure across such orifice, is representative of a temperature factor of the hot fluid and, if the high-side orifice pressure is maintained constant, is representative of the actual temperature of the fluid on a properly calibrated scale.

The temperature-responsive system of applicant's aforesaid copending application may be applied also to the control of various elastic-fluid operated devices. For example, in a gas turbine or jet engine power plant, the turbine speed and the combustion chamber temperature are factors which must be closely watched and carefully regulated. If the turbine speed becomes excessive, serious mechanical damage will result. If the combustion chamber temperature becomes too high, the turbine will be overheated, shortening its life or destroying it completely. Too low a combustion chamber temperature will result in burner blowout, causing loss of power which is, of course, highly undesirable. It is also a serious problem to re-ignite the burners after burner blowout so that it is extremely important to prevent burner blowout.

However, to obtain maximum efficiency and power output from a given jet or turbine engine, it is necessary that the highest practical combustion chamber temperature be used consistent with safe operation and desirable service life. It is, therefore, necessary accurately to measure the combustion chamber temperature and maintain it at all times within desired limits.

There are a number of ways in which the maximum temperature and the maximum speed of a gas turbine may be controlled. For example, on excessive combustion chamber temperatures the fuel to the engine may be reduced or, in the case of a turbo-compressor engine, the pitch of the compressor blades may be flattened to increase the air flow to the engine, in either case reducing the effective fuel-to-air ratio and lowering the combustion chamber temperature as required. Further, when the combustion chamber temperature approaches the lower limiting value requisite to the maintenance of combustion, the fuel flow to the engine may be increased or, in the case of a turbo-compressor engine, the pitch of the compressor blades may be increased, effectively to increase the fuel-to-air ratio and thereby raise the combustion chamber temperature to a value appropriate to proper combustion. Again, if the combustion chamber temperature falls below the minimum value suitable for proper combustion, the ignition system of the engine may be automatically placed into operation as a safeguard against burner blowout. With the ignition system excited, should burner blowout occur, re-ignition will take place upon a restoration of a favorable fuel-to-air ratio before the speed of the turbine has dropped so low as to make it impossible to re-ignite the burner.

It is an object of the present invention, therefore, to provide a new and improved temperature-responsive elastic-fluid control system for controlling an elastic-fluid operated device in which one or more operating conditions of the device are automatically maintained within safe limits.

It is another object of the invention to provide a new and improved temperature-responsive elastic-fluid control system which, when applied to an internal combustion gas turbine, is effective to maintain the turbine at all times within safe operating limits of speed and temperature. When such a turbine is installed in an aircraft, the pilot is thus freed from all concern as to the proper operation of his engines and permitted to give his undivided attention to the maneuvering of the aircraft.

In accordance with the invention, there is provided a system for controlling an elastic-fluid operated device in response to a temperature factor of the elastic fluid at a point in the vicinity thereof comprising means for establishing an elastic-fluid flow between such point and a remote point of substantially different temperature, means at one of such points for deriving an effect varying with the volumetric flow therethrough, means at the other of such points for determining a mass-flow factor of such fluid flow, and means responsive to such effect for controlling an operating condition of the device.

More specifically in accordance with the invention, there is provided a system for controlling an elastic-fluid heat-power engine jointly in response to the speed of the engine and to a temperature factor of the elastic fluid at a point in the vicinity thereof comprising means for establishing an elastic-fluid flow between such point and a remote point of substantially different temperature, and means at one of the points for deriving an effect varying with the volumetric flow therethrough. The system also includes means at the other of such points for determining a mass-flow factor of the fluid flow, means for developing a second effect of a type similar to the first effect and representative of the speed of the engine, and means responsive jointly to such two effects for controlling an operating condition of the engine.

In a specific form of the invention there is provided a system for controlling a high-temperature elastic-fluid device in response to a temperature factor of the elastic fluid at a point in the vicinity thereof comprising means for establishing an elastic-fluid flow between such point and a remote point of substantially lower temperaure. The system also includes means at one of such points responsive to the volumetric flow therethrough, means at the other of such points for determining a mass-flow factor of such fluid flow, and a two-position relay actuated by said flow-responsive means for determining maximum and minimum operating conditions of the device.

For a better understanding of the present invention, together with other and further objects thereof, reference is had to the following description taken in connection with the accompanying drawings, and its scope will be pointed out in the appended claims.

Figures 2, 3:
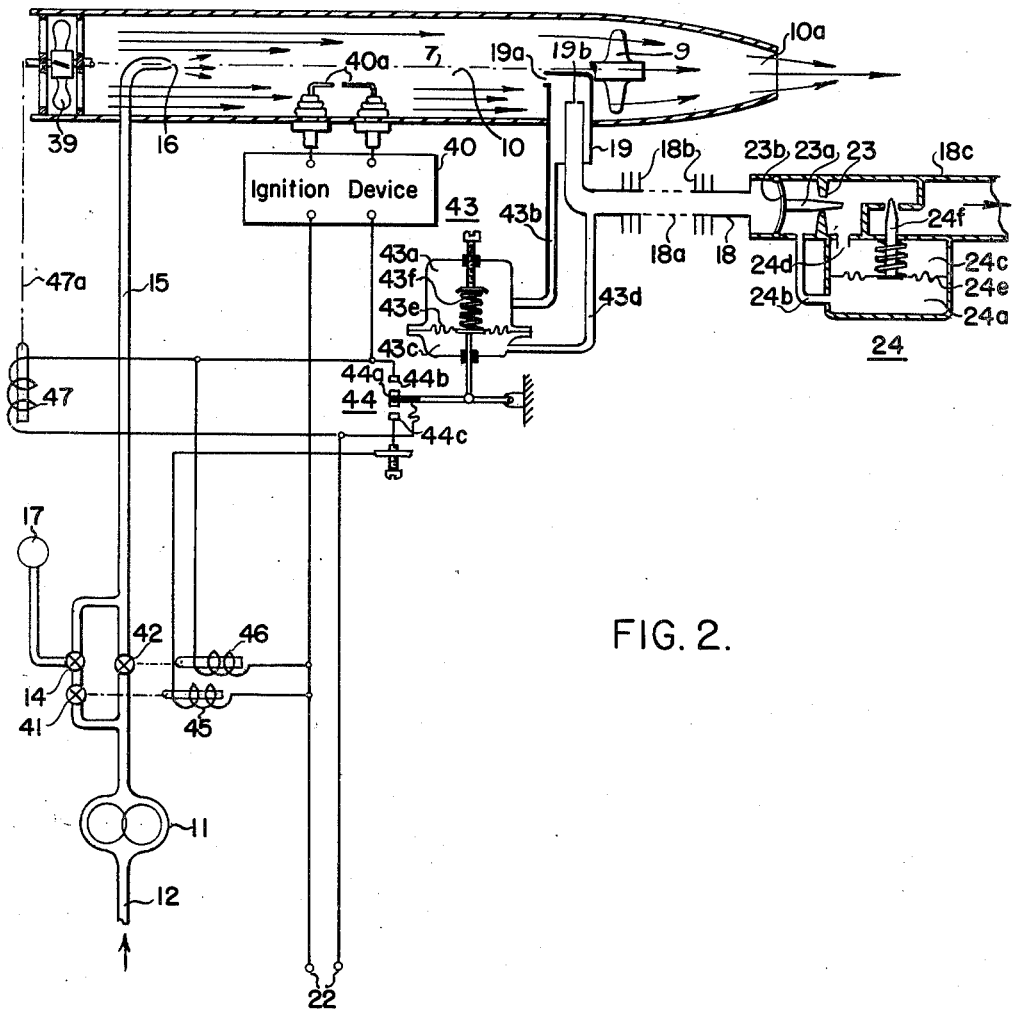

Referring now to the drawings, Fig. 1 is a schematic representation of a complete temperature-responsive elastic-fluid control system as applied to the control of an internal-combustion gas turbine for maintaining it within safe operating limits of temperature and speed; Fig. 2 is a schematic representation of a modified form of temperature-responsive elastic-fluid control system for controlling the ignition system, the fuel supply, and the pitch of the compressor blades of an aircraft internal-combustion turbo-compressor engine to maintain a fuel-to-air ratio within proper limits and the ignition system in proper operation; while Fig. 3 is a schematic representation of an alternative control apparatus suitable for embodiment in the system of Fig. 2.

Referring now to Fig. 1 of the drawings, there is represented a system for controlling an elastic-fluid operated device, specifically a high-temperature heat-power engine 10 of the internal-combustion turbo compressor type suitable for use on aircraft and including a compressor 8 driven by a turbine 9 through a shaft 7. The device 10 is shown schematically since it may be of any well-known conventional type and comprises no part of the present invention. The device 10 is provided with an adjustable fuel supply comprising a fuel pump 11 of any suitable type, drawing fuel from a fuel inlet 12 and supplying it through a pair of adjustable valves 13 and 14, effectively in parallel as by being included in parallel branches of the main fuel supply line 15. The line 15 terminates in a fuel nozzle 16 within the combustion chamber of device 10. The valve 14 is manually adjustable, as by a throttle 17, to adjust a normal operating condition of the device, specifically to set the normal fuel supply in accordance with the desired power output of the engine.

The system of Fig. 1 is arranged to control the device 10 in response to a temperature factor of the fluid at a point in the vicinity of the device, specifically at a point within the device 10 near the fluid-discharge nozzle 10a. This system includes means for establishing an elastic-fluid flow between such point and a remote point of substantially different temperature. This means may be in the form of a conduit 18 terminating in a pickup or sampling fixture 19 projecting into the combustion chamber of device 10 for extracting elastic fluid from the device. As illustrated, the pickup device 19 is provided with an upstream inlet 19a so that it develops therein a static pressure resulting from both the static and kinetic energy of the elastic fluid flowing through the device 10. The conduit 18 includes means for changing the temperature of, specifically cooling, the fluid extracted from the device 10. In case the conduit is of considerable length, as indicated by the dotted-line portion 18a, it may provide sufficient heat transfer to lower the temperature of the extracted fluid substantially to ambient. In certain applications, however, it may be desirable to add cooling fins 18b to facilitate cooling of the high-temperature extracted fluid.

The control system includes also orifice means at one of the aforementioned points, specifically at the point in the vicinity of the device 10 and at the high-temperature side of the cooling means, for deriving an effect, specifically a differential pressure, varying with the volumetric flow therethrough. This orifice means may be an orifice or equivalent constriction 19b within the fixture 19 and constituting a termination of the conduit 18 within the fixture 19. There is also provided means responsive to such volumetric flow, specifically a differential pressure device 20 including a housing 20a connected by conduit 20b to the conduit 18 and enclosing a Sylphon bellows 20c or equivalent pressure-responsive element connected by a conduit 20d to the interior of the pickup fixture 19. There is further provided a voltage divider 21 having an adjustable contact 21a and energized from a suitable source of alternating current such as the supply terminals 22. The contact 21a is connected to be actuated by the differential pressure-responsive means 20 to develop at the contacts 21a an electrical signal varying with such volumetric flow. By the term "electrical signal" at the contact 21a, and at other like adjustable contacts hereinafter referred to, is meant the voltage difference appearing between such contact and a reference point in the electrical circuit, such as one of the supply terminals 22.

The control system of the invention further includes means at the other of the two points, that is, at the remote low-temperature side of the cooling means or conduit 18, for determining a mass-flow factor of the fluid flow. This massflow-determining means may be in the form of an orifice or equivalent means 23 disposed in an enlargement 18c of conduit 18 for developing a differential pressure effect representative of the volumetric flow through the conduit, and means responsive to such effect for maintaining the fluid-mass flow through the conduit 18 substantially constant. This latter means may be in the form of a differential pressure device 24 provided with a lower chamber 24a connected by conduit 24b with the high-pressure side of the orifice 23 and an upper chamber 24c connected by a port 24d with the low-pressure side of the orifice 23. The chambers 24a and 24c are separated by a diaphragm 24e. This mass-flow determining means further includes a valve 24f actuated by the diaphragm 24e and biased by a spring 24g. In case the cooling means provided by conduit 18 is unable to reduce the temperature of the fluid extracted from the device 10 to a substantially constant value, the orifice 23 may be compensated by a tapered plug 23a actuated by a temperature-responsive bi-metallic strip 23b. However, the mass-flow determining means 23, 24, per se, forms no part of the present invention but is a part of the invention described and claimed in the copending application of applicant and Alfred G. Nash, Serial No. 724,142, filed January 24, 1947, now Patent 2,549,622, and assigned to the same assignee as the present application.

The control system of the invention also includes means for developing a second effect of a type similar to that representative of the volumetric fluid flow and representative of the speed of the gas turbine. This means may be in the form of a voltage divider 25 having an adjustable contact 25a and means responsive to the speed of the engine for actuating the contact 25a. This latter means may be in the form of a conventional centrifugal governor 26 driven by the engine shaft 7 through a suitable mechanism, represented schematically by the gearing 27. An extension 25b of the contact member 25a is biased into engagement with the governor 26 by a spring 25c. By this means there is developed at the contact 25a an electrical signal representative of the speed of the engine.

The control system of the invention further includes one or more means for setting an extreme operating condition or conditions of the device 10 as, for example, means for setting the maximum and minimum temperature and maximum speed. Specifically, this latter means is in the form of a plurality of means for developing effects of the same type as the volumetric flow effect and individually representative of such extreme operating conditions. These means are in the form of a plurality of voltage dividers 28, 29, and 30 having manually adjustable contacts 28a, 29a, and 30a, respectively. The voltage dividers 25, 28, 29, and 30 are like the voltage divider 21, energized from the supply circuit terminals 22. The adjustable contact 28a may be set in accordance with maximum safe turbine speed; the adjustable contact 29a may be set to represent the maximum safe burner temperature; while the adjustable contact 30a may be set to represent the minimum burner temperature requisite for proper combustion.

The control system of the invention further includes means responsive to one or more of the above-described effects or electrical signals for controlling an operating condition of the device 10. This controlling means is responsive jointly to, specifically to the algebraic sum of, the volumetric flow effect or signal at the adjustable contact 21a and one or more of the other effects or signals at the contacts 25a, 28a, 29a, and 30a for adjusting the supply of fuel to the device 10, specifically by modifying the effectiveness of the manually adjustable valve 14. To this end there is provided a servo-mechanism responsive to the voltage difference between certain of the above-mentioned adjustable contacts for adjusting the valve 13 in parallel with the manually adjustable valve 14. This servo-mechanism comprises a transformer 31 having a plurality of primary windings 31a, 31b, and 31c. The winding 31a is responsive to the algebraic sum of the electrical signal at the contact 25a, which is representative of the actual speed of the engine, and that at the contact 28a, which is manually set to represent the maximum safe speed. Similarly, the winding 31b is responsive to the algebraic sum of the electrical signal at the contact 21a, which is representative of the volumetric fluid flow through the conduit 18, and thus of the temperature in the device 10, and that at the adjustable contact 30a, which is set to represent the minimum operating temperature of the device 10. Again, the winding 31c is connected to respond to the algebraic sum of the electrical signal at the contact 21a and that at the adjustable contact 29a, which is repretative of the maximum safe operating temperature for the device 10. The windings 31a and 31c are connected in like phase and in phase opposition to the winding 31b. The transformer 31 is provided with a single secondary winding 31d in which is induced a voltage proportional to the algebraic sum of the voltages or electrical signals impressed upon windings 31a, 31b, and 31c. The secondary winding 31d is connected by way of an amplifier 32 of any suitable type to one phase winding 33a of a phase-responsive device, such as a two-phase motor 33, having a second phase winding 33b connected directly to the supply circuit terminals 22. The amplifier 32 is preferably designed to introduce an approximately 90-degree phase displacement between its input and output signals.

In considering the operation of the control system of Fig. 1, it will be assumed that the mass-flow determining means 23, 24 is effective to maintain constant the mass flow of elastic fluid extracted from the device 10 through the conduit 18. As explained in more detail in aforesaid Patent No. 2,549,622, if the temperature of the elastic fluid through the orifice 23 is constant, the area of the orifice is maintained constant, and a constant differential pressure is maintained across the orifice by means of the valve 24f controlled by the differential pressure-responsive device 24, the mass flow through the conduit 18 will be maintained constant. On the other hand, if the temperature of the fluid at the orifice 23 varies substantially, the fluid-mass flow through the conduit may still be maintained constant by compensating the area of the orifice 23 inversely proportionally to the square root of the absolute temperature. This is effected by means of the plug 23a which is designed to have a configuration or taper related to the characteristic of its bi-metallic actuating strip 23b to vary the area of the orifice 23 inversely proportionally to the square root of the absolute temperature at that point.

Therefore, assuming that the fluid-mass flow through the conduit 18 is maintained constant, as described above, and that the system is otherwise initially in equilibrium, the contacts of the various voltage dividers 21, 25, 28, 29, and 30 will be adjusted to such positions that the resultant or algebraic sum of the signals impressed on the windings 31a, 31b, and 31c is zero, no signal is induced in the secondary winding 31d and no excitation is applied to the winding 33a of motor 33 and it is inactive. Under these conditions, valves 13 and 14 are effective to supply to the device 10 the proper amount of fuel to maintain the fuel-to-air ratio in the device 10 at a value corresponding to a proper combustion temperature and a maximum safe operating speed.

If, now, the temperature of the fluid in the device 10 should tend to rise above a safe value, for example, because of an increased fuel pressure and fuel supply to the device, the increase in differential pressure across the orifice 19b, which is representative of such temperature, is effective to actuate the device 20 to adjust the contact 21a of voltage divider 21. The adjustment of contact 21a is effective to increase the excitation of the winding 31b and to decrease the excitation of the winding 31c to upset the balance of the transformer 31 and to supply a signal through amplifier 32 to the winding 33a of the motor 33 in quadrature with the excitation of winding 33b. The motor 33 then operates to adjust the valve 13 in a sense to decrease the fuel supply through the branch in parallel with the throttle valve 14, thereby to reduce the fuel to the device 10 and lower its temperature. The fuel supply to the device 10 will thus be progressively decreased until the voltage difference between the contact 21a and the contact 29a, representing the maximum safe operating temperature, is equal and opposite to the voltage difference between the contact 21a and the contact 30a, representing the minimum operating temperature. Under this condition of equilibrium it will be apparent that the temperature of the fluid in the device 10, as represented by the setting of the contact 21a, will be midway between limiting temperatures represented by the settings of the contacts 29a and 30a. It is to be noted that, for temperatures between the maximum and minimum settings of contacts 29a and 30a, respectively, the excitation of windings 31b and 31c is such that they act differentially while for temperatures beyond such limiting settings their excitation is such that they act cumulatively; therefore, should the temperature drift momentarily beyond either limiting value, a powerful corrective action is developed. Obviously, should the temperature of the fluid in the device 10 tend to decrease for any cause, the converse of the operation described above will take place.

On the other hand, should the speed of the motor tend to exceed a safe value due to a decrease in load, as by operation at a higher altitude, the contact 25a will be adjusted so that the electrical signal thereat is different from that at the contact 28a representative of the safe maximum operating speed and the voltage difference between these two contacts is impressed upon the winding 31a which upsets the balance of the transformer 31 to excite the phase winding 33a of the motor 33 in a sense to reduce the fuel supplied to the device 10 through the valve 13. The effect of this adjustment is again to reduce the fuel-to-air ratio of the device 10 to reduce its power output and thus to reduce its operating speed to a safe value. This adjustment will continue in effect until the speed has been reduced to the safe value at which the electrical signal at the contact 25a again equals that at the contact 28a and the system is restored to equilibrium. In the system described, the equilibrium condition corresponds to an operating speed equal to the safe maximum operating speed as represented by the setting of the contact 28a.

Thus, by means of the control system of Fig. 1, the gas turbine 10 is maintained at or near its maximum safe operating speed while the temperature of its combustion chamber is maintained between maximum and minimum limits appropriate to proper operation. Thus, the pilot of the aircraft in which the turbine 10 is mounted is free from attention to the operation of his engines and permitted to give his undivided attention to the maneuvering of the aircraft.

Referring now to Fig. 2, there is represented schematically a modified system for controlling a device of the type described, for example, a turbo-compressor 10 including a turbine 9 and a compressor 39 having adjustable pitch blades, in response to the temperature in its combustion chamber, such turbine having an ignition system including an ignition device 40 energized from the supply circuit terminals 22 and feeding ignition electrodes 40a. The device 10 is also provided with an adjustable fuel supply including the normal throttle valve 14 manually adjustable by the throttle 17 and regulating valves 41 and 42 individually in series and in parallel, respectively, with the throttle valve 14. As in the system of Fig. 1, there is provided a pickup fixture 19 connected to a conduit 18 for extracting elastic fluid from a point in the vicinity of, specifically within, the combustion chamber of device 10 and conducting it to a remote point at which the fluid-mass flow is maintained constant by means of the elements 23, 24 as in the system of Fig. 1. The system also includes means responsive to the volumetric flow at the orifice 19b for developing an effect representative of such flow. This means may be in the form of a differential-pressure responsive relay 43 having a chamber 43a connected to the high-pressure side of the orifice 19b through a conduit 43b and a chamber 43c connected to the low-pressure side of the orifice 19b through a conduit 43d. The chambers 43a and 43c are separated by a diaphragm 43e biased by an adjustable spring 43f.

The control system of Fig. 2 further includes means responsive to the differential pressure effect developed by the relay 43, specifically, a two-position switch 44 having an adjustable contact 44a actuated by the flow-responsive relay 43 and co-operating stationary contacts 44b and 44c.

The relay 43 and switch 44 are effective to control a number of operating conditions. For example, they are effective to determine the maximum and minimum operating conditions of the device 10, for example, the maximum and minimum temperatures as determined by maximum and minimum fuel flows to the device. To this end, there is provided means controlled by the relay 43 in its high-flow position, in which the contacts 44a and 44c are closed, for limiting the fuel supplied to the device to a predetermined value. This means may be in the form of a solenoid 45 energized from supply-circuit terminals 22 through the contact 44c and connected to actuate the valve 41 in series with the normal throttle valve 14 to limit the maximum fuel flow to the device 10 and thereby limit its maximum temperature. There is also provided means controlled by the relay 43 and switch 44 in its low-flow position, in which the contacts 44a and 44b are closed, for increasing the fuel supply to the device 10. To this end, there is provided a solenoid 46 energized from the supply-circuit terminals 22 through the contact 44b and connected to actuate the valve 42 in parallel with the normal throttle valve 14 to supply a predetermined minimum fuel to the device 10 irrespective of the setting of the throttle valve 14 and thus to limit its minimum temperature.

The relay 43 and switch 44 are also effective to control the energization of the ignition system 40, 40a for values of combustion chamber temperature below a predetermined minimum. To this end, the ignition device 40 is energized from the supply circuit terminals 22 through the low-flow contacts 44a, 44b of the switch 44.

Further, the relay 43 and the switch 44 are effective to control the pitch of the variable-pitch propeller 39. To this end, there is provided a solenoid 47 energized from the supply terminals 22 through the low-flow contacts 44a, 44b and connected by a mechanism, indicated schematically at 47a, to increase the pitch of the propeller 39, thus effectively to increase the fuel-to-air ratio of the device 10 and raise the combustion chamber temperature.

It is believed that the operation of the system of Fig. 2, which operates on essentially the same principles as that of Fig. 1, will be apparent from the foregoing description. The two-position relay 43 and its associated switch 44 are effective to maintain the combustion chamber temperature of the device 10 between maximum and minimum safe operating limits; to energize the ignition system 40, 40a should the combustion chamber temperature tend to approach a minimum safe value for proper combustion; and to increase the pitch of the blades of compressor 39 to increase the fuel-to-air ratio of the device 10 should the temperature of the combustion device tend to fall below a safe operating value as indicated by the closing of the low-flow contacts 44a, 44b.

Referring now to Fig. 3, there is represented schematically an alternative control apparatus suitable for use in the system of Fig. 2 but providing continuous or proportional control of the fuel supply and the pitch of the compressor blades rather than discontinuous control at maximum and minimum safe combustion chamber temperatures. In the arrangement of Fig. 3, the differential pressure at the orifice 19b is applied by way of the conduits 43b and 43d to a differential-pressure responsive device 50 comprising a housing 50a enclosing a Sylphon bellows 50b. The device 50 is connected to actuate an armature 51a of a solenoid 51 energized from the supply-circuit terminals 22. Also connected across the supply terminals 22 is a voltage divider comprising resistors 52 and 53 forming with the solenoid 51 a bridge circuit. The solenoid 51 is provided with a mid-tap 51b and the unbalance bridge signal between the tap 51b and the junction of resistors 52 and 53 is impressed upon an amplifier and phase-shifter unit 54 which may be of any conventional type designed to introduce a phase shift of approximately 90 degrees between its input and output terminals. The amplifier unit 54 is connected to energize a winding 55a of a phase-responsive device, such as a two-phase motor 55, having a second phase winding 55b connected directly to the supply-circuit terminals 22. The motor 55 is connected by way of a mechanism, indicated schematically at 55c, to actuate the fuel valves 41 and 42 of Fig. 2 in opposite senses and to adjust the pitch of the blades of compressor 39. It is also connected by a mechanism, indicated schematically at 55d, to actuate the adjustable contact 44a of switch 44 which, in this embodiment, is connected only to control the energization of the ignition device 40.

It is believed that the operation of the control system of Fig. 3 will be apparent from the foregoing description in connection with the description of the operation of the previous control systems. In brief, when the system is in equilibrium, the armature 51a of the solenoid 51 occupies a mid-position so that the electrical signal at the tap 51b is equal to that of the junction of the resistors 52 and 53 and no signal is applied by way of amplifier 54 to the winding 55a and the motor 55 is stationary. Upon an increase in differential pressure across the orifice 19b, representing an increase in temperature of the fluid in the device 10, the differential-pressure responsive device 50 is effective to actuate the armature 51a to unbalance the bridge 51, 52, 53 to apply a signal to the winding 55a through the amplifier 54 of such a polarity as to energize the motor 55 to actuate the valves 41 and 42 to decrease the fuel supplied to the device 10 and, simultaneously, to decrease the pitch of the blades of compressor 39 to decrease the fuel-to-air ratio of the device 10. Both of these adjustments have the effect of reducing the temperature of the combustion chamber of the device 10. The connection 55d is such that it actuates the movable contact 44a of switch 44 only for its extreme operating positions. When the contact 44a closes with the low-flow contact 44b, representative of low combustion-chamber temperature, the ignition device 40 is energized from the supply-circuit terminals 22, as in the system of Fig. 2, to ensure that the combustion chamber is re-ignited in case of burner blowout.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for controlling an elastic-fluid operated device in response to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, and means responsive to said effect for controlling an operating condition of said device.

2. A system for controlling an elastic-fluid operated device in response to a temperature factor of the elastic fluid comprising, conduit means for extracting elastic fluid from said device and including means for changing the temperature thereof, means at one side of said temperature-changing means for deriving an effect varying with the volumetric flow therethrough, means at the other side of said temperature-changing means for determining a mass-flow factor of said fluid flow, and means responsive to said effect for controlling an operating condition of said device.

3. A system for controlling an elastic-fluid operated device in response to a temperature factor of the elastic fluid at a point in the vicinity thereof comprising, means for establishing an elastic-fluid flow between said point and a remote point of substantially different temperature, means at said point in the vicinity of said device for deriving an effect varying with the volumetric flow therethrough, means at said remote point for determining a mass-flow factor of said fluid flow, and means responsive to said effect for controlling an operating condition of said device.

4. A system for controlling an elastic-fluid operated device in response to a temperature factor of the elastic fluid at a point in the vicinity thereof comprising, means for establishing an elastic-fluid flow between said point and a remote point of substantially different temperature, means at each of said points for developing a differential-pressure effect representative of the volumetric fluid flow therethrough, means responsive to one of said effects for maintaining the fluid-mass flow substantially constant, and means responsive to the other of said effects for controlling an operating condition of said device.

5. A system for controlling a high-temperature elastic-fluid operated device in response to a temperature factor of the elastic fluid comprising, conduit means for extracting elastic fluid from said device and including fluid-cooling means, orifice means at the high-temperature side of said cooling means for deriving a differential pressure varying with the volumetric flow therethrough, orifice means at the low-temperature side of said cooling means, a valve in said conduit controlled by the differential pressure across said low-temperature orifice for determining a mass-flow factor of said fluid flow, and means responsive to said differential pressure for controlling an operating condition of said device.

6. A system for controlling an elastic-fluid operated device in response to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, means for setting an extreme operating condition of said device, and means responsive jointly to said effect and to the setting of said setting means for controlling an operating condition of said device.

7. A system for controlling a high-temperature elastic-fluid operated device in response to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, means for setting maximum and minimum operating temperatures of said device, and means responsive jointly to said effect and to the settings of said setting means for controlling an operating condition of said device.

8. A system for controlling a high-temperature elastic-fluid operated device in response to a temperature factor of the elastic fluid at a point in the vicinity thereof comprising, means for establishing an elastic-fluid flow between said point and a remote point of substantially different temperature, means at one of said points for deriving an electrical signal varying with the volumetric flow therethrough, means at the other of said points for determining a mass-flow factor of said fluid flow, a plurality of means for developing electrical signals individually representative of the maximum and minimum operating temperatures of said device, and means responsive to the algebraic sum of said electrical signals for controlling an operating condition of said device.

9. A system for controlling an elastic-fluid operated device in response to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, means for manually adjusting an operating condition of said device, and means responsive to said effect for modifying the effectiveness of said adjusting means.

10. A system for controlling an elastic-fluid operated device in response to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, means for manually adjusting an operating condition of said device, means for setting an extreme operating condition of said device, and means responsive jointly to said effect and to the setting of said setting means for modifying the effectiveness of said adjusting means.

11. A system for controlling an elastic-fluid operated device in response to a temperature factor of the elastic fluid at a point in the vicinity thereof comprising, means for establishing an elastic-fluid flow between said point and a remote point of substantially different temperature, means at one of said points for deriving an electrical signal varying with the volumetric flow therethrough, means at the other of said points for determining a mass-flow factor of said fluid-flow, and means responsive to said electrical signal for controlling an operating condition of said device.

12. A system for controlling an elastic-fluid operated device in response to a temperature factor of the elastic fluid at a point in the vicinity thereof comprising, means for establishing an elastic-fluid flow between said point and a remote point of substantially different temperature, means at one of said points for deriving an electrical signal varying with the volumetric flow therethrough, means at the other of said points for determining a mass-flow factor of said fluid flow, means for developing an electrical signal representative of an extreme operating condition of said device, and means responsive jointly to said electrical signals for controlling an operating condition of said device.

13. A system for controlling an elastic-fluid operated device in response to a temperature factor of the elastic fluid at a point in the vicinity thereof comprising, means for establishing an elastic-fluid flow between said point and a remote point of substantially different temperature, means at one of said points for deriving an electrical signal varying with the volumetric flow therethrough, means at the other of said points for determining a mass-flow factor of said fluid flow, means for developing an electrical signal representative of a maximum operating condition of said device, means for developing an electrical signal representative of a minimum operating condition of said device, and means responsive jointly to said three electrical signals for controlling an operating condition of said device.

14. A system for controlling a high-temperature elastic-fluid operated device having an adjustable fuel supply means in response to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, and means responsive to said effect for adjusting the supply of fuel to said device.

15. A system for controlling a high-temperature elastic-fluid operated device having a pair of adjustable fuel valves effectively in parallel, one of said valves being manually adjustable, in response to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, and means responsive to said effect for adjusting the other of said valves.

16. A system for controlling an elastic-fluid heat-power engine jointly in response to the speed of the engine and to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, means for developing a second effect of similar type representative of the speed of the engine, and means responsive jointly to said two effects for controlling an operating condition of the engine.

17. A system for controlling an elastic-fluid heat-power engine jointly in response to the speed of the engine and to a temperature factor of the elastic fluid at a point in the vicinity thereof comprising, means for establishing an elastic-fluid flow between said point and a remote point of substantially different temperature, means at one of said points responsive to the volumetric flow therethrough, a first voltage divider having an adjustable contact connected to be actuated by said responsive means, means at the other of said points for determining a mass-flow factor of said fluid flow, a second voltage divider having an adjustable contact, means responsive to the speed of the engine for actuating said second divider contact, and means responsive to the voltage difference between said contacts for controlling an operating condition of the engine.

18. A system for controlling an elastic-fluid heat-power engine jointly in response to the speed of the engine and to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, means for developing a second effect of similar type representative of the speed of the engine, means for setting an extreme temperature of said engine, and means responsive jointly to said two effects and to the setting of said setting means for controlling an operating condition of the engine.

19. A system for controlling an elastic-fluid heat-power engine jointly in response to the speed of the engine and to a temperature factor of the elastic fluid at a point in the vicinity thereof comprising, means for establishing an elastic-fluid-flow between said point and a remote point of substantially different temperature, means at one of said points for deriving an effect varying with the volumetric flow therethrough, means at the other of said points for determining a mass-flow factor of said fluid flow, means for developing a second effect of similar type representative of the speed of the engine, means for individually setting the maximum and minimum temperatures of said engine, and means responsive jointly to said two effects and to the settings of said setting means for controlling an operating condition of the engine.

20. A system for controlling an elastic-fluid heat-power engine jointly in response to the speed of the engine and to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, means for developing a second effect of similar type representative of the speed of the engine, means for setting an extreme speed of said engine, and means responsive jointly to said two effects and to the setting of said setting means for controlling an operating condition of the engine.

21. A system for controlling an elastic-fluid heat-power engine jointly in response to the speed of the engine and to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, means for developing a second effect of similar type representative of the speed of the engine, means for setting a maximum speed of said engine, means for individually setting the maximum and minimum temperatures of said engine, and means responsive jointly to said two effects and to the settings of all said setting means for controlling an operating condition of the engine.

22. A system for controlling an elastic-fluid heat-power engine having an adjustable fuel supply jointly in response to the speed of the engine and to a temperature factor of the elastic fluid at a point in the vicinity thereof comprising, means for establishing an elastic-fluid flow between said point and a remote point of substantially different temperature, means at one of said points for deriving an effect varying with the volumetric flow therethrough, means at the other of said points for determining a mass-flow factor of said fluid flow, means for developing a second effect of similar type representative of the speed of the engine, and means responsive jointly to said two effects for adjusting the fuel supply of the engine.

23. A system for controlling a high-temperature elastic-fluid device in response to a temperature factor of the elastic fluid at a point in the vicinity thereof comprising, means for establishing an elastic-fluid flow between said point and a remote point of substantially lower temperature, means at one of said points responsive to the volumetric flow therethrough, means at the other of said points for determining a mass-flow factor of said fluid flow, and a two-position relay actuated by said flow-responsive means for determining maximum and minimum operating conditions of said device.

24. A system for controlling a high-temperature elastic-fluid device having an adjustable fuel supply in response to a temperature factor of the elastic fluid at a point in the vicinity thereof comprising, means for establishing an elastic-fluid flow between said point and a remote point of substantially lower temperature, means at one of said points responsive to the volumetric flow therethrough, means at the other of said points for determining a mass-flow factor of said fluid flow, a two-position relay actuated by said flow-responsive means, means controlled by said relay in its high-flow position for limiting the fuel supply to said device to limit the maximum temperature thereof, and means controlled by said relay in its low-flow position for increasing the fuel supply to limit the minimum temperature of said device.

25. A system for controlling a high-temperature elastic-fluid device having an adjustable fuel supply in response to a temperature factor of the elastic fluid at a point in the vicinity thereof comprising, means for establishing an elastic-fluid flow between said point and a remote point of substantially lower temperature, means at one of said points responsive to the volumetric flow therethrough, means at the other of said points for determining a mass-flow factor of said fluid flow, and a two-position relay actuated by said flow-responsive means for determining maximum and minimum fuel flows to said device.

26. A system for controlling a high-temperature elastic-fluid internal combustion device having an ignition system in response to a temperature factor of the elastic fluid at a point in the vicinity thereof comprising, means for establishing an elastic-fluid flow between said point and a remote point of substantially lower temperature, means at one of said points for developing an effect representative of the volumetric flow therethrough, means at the other of said points for determining a mass-flow factor of said fluid flow, and means responsive to said effect for energizing said ignition system for values of said effect below a predetermined minimum.

27. A system for controlling a high-temperature elastic-fluid internal combustion device having an ignition system in response to a temperature factor of the elastic fluid at a point in the vicinity thereof comprising, means for establishing an elastic-fluid flow between said point and a remote point of substantially lower temperature, means at one of said points responsive to the volumetric flow therethrough, means at the other of said points for determining a mass-flow factor of said fluid flow, and a two-position relay actuated by said flow-responsive means and effective in its low-flow position to energize said ignition system.

28. A system for controlling a high-temperature elastic-fluid turbo-compressor having adjustable-pitch compressor blades in response to a temperature factor of the elastic fluid at a point in the vicinity thereof comprising, means for establishing an elastic-fluid flow between said point and a remote point of substantially lower temperature, means at one of said points for developing an effect representative of the volumetric flow therethrough, means at the other of said points for determining a mass-flow factor of said fluid flow, and means responsive to said effect for controlling the pitch of the compressor blades.

29. A system for controlling a high-temperature elastic-fluid turbo-compressor having adjustable-pitch compressor blades in response to a temperature factor of the elastic fluid at a point in the vicinity thereof comprising, means for establishing an elastic-fluid flow between said point and a remote point of substantially lower temperature, means at one of said points for developing an effect representative of the volumetric flow therethrough, means at the other of said points for determining a mass-flow factor of said fluid flow, and means responsive to said effect for increasing the pitch of the compressor blades for values of said effect below a predetermined minimum.

30. A system for controlling a high-temperature elastic-fluid turbo-compressor having adjustable-pitch compressor blades in response to a temperature factor of the elastic fluid at a point in the vicinity thereof comprising, means for establishing an elastic-fluid flow between said point and a remote point of substantially lower temperature, means at one of said points responsive to the volumetric flow therethrough, means at the other of said points for determining a mass-flow factor of said fluid flow, and a two-position relay actuated by said flow-responsive means and effective in its low-flow position to increase the pitch of the compressor blades.

DAVID W. MOORE, Jr.

REFERENCES CITED

The following references are of record in the file of this patent:

UNITED STATES PATENTS

| Number | Name | Date |
| --- | --- | --- |
| 2,321,024 | Hammond | June 8, 1943 |
| 2,400,415 | Hersey | May 14, 1946 |
| 2,405,888 | Holley, Jr. | Aug. 13, 1946 |
| 2,457,595 | Orr | Dec. 28, 1948 |
| 2,482,254 | Fairchild | Sept. 20, 1949 |
| 2,488,783 | Stalker | Nov. 22, 1949 |